Nov. 22, 1932.   A. J. PENICK ET AL   1,888,392
SAFETY VALVE
Original Filed May 5, 1930
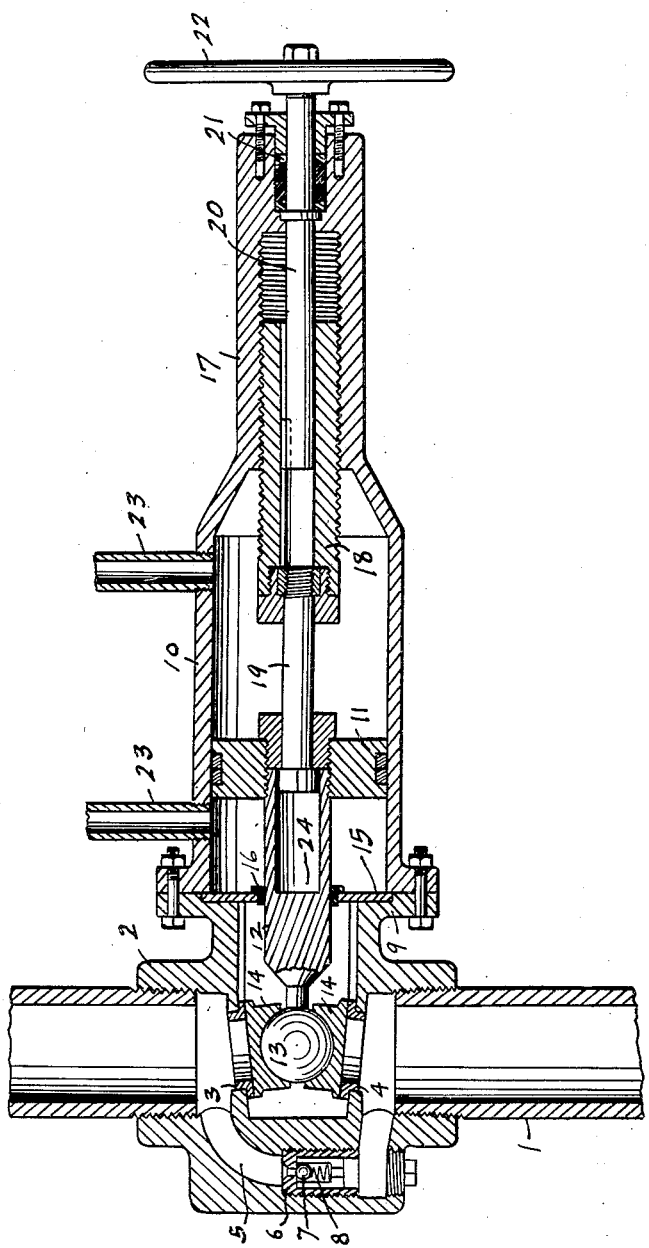
Inventors
Arthur J. Penick
Kirby T. Penick
By Hardway Cathey
Attorneys Patented Nov. 22, 1932

1,888,392

UNITED STATES PATENT OFFICE

ARTHUR J. PENICK AND KIRBY T. PENICK, OF HOUSTON, TEXAS

SAFETY VALVE

Application filed May 5, 1930, Serial No. 450,026. Renewed September 22, 1932.

This invention relates to new and useful improvements in a safety valve.

One object of the invention is to provide a safety valve mechanism specially designed for attachment to the upper end of a casing in a well bore and whereby the casing may be quickly and securely closed in case gas pressure is encountered in the well.

Another object of the invention is to provide a mechanism of the character described embodying valve controlling means through which the valve may be opened or closed by the application of fluid under pressure to said controlling means.

A further feature of the invention resides in the provision of a manually controllable device through which said valve controlling means may be operated to open or close the valve and through which the valve may be secured in either position.

With the above and other objects in view this invention has particular relation to certain novel features of construction, operation, and arrangement of parts an example of which is given in this specification and illustrated in the accompanying drawing, wherein:—

The figure shows a longitudinal, vertical, sectional view of the valve.

In the drawing the numeral 1 designates a casing set in a well bore. Incorporated into this casing, near its upper end, there is a valve casing 2 having the upper and lower valve seats 3, 4 aligned with the passageway through said casing. Around said seats, on one side, there is the bypass 5 in which there is a valve seat 6 controlled by the back pressure valve 7 which is seated on the spring 8. At the other side the casing 2 has a flange connection 9 to which a cylinder 10 is attached, and in this cylinder there is a piston 11. There is a valve rod 12 attached, at one end, to the piston 11 and whose other end has a ball bearing 13. On this ball bearing are mounted the oppositely disposed valves 14, 14. Between said piston and the valves 14 there is a transverse web or partition, 15, forming the end of the cylinder 10 and through a stuffing box 16 of which the valve rod 12 works. The seats 3, 4, converge outwardly, as shown, so that the valves 14, 14, when moved to seated, or closed, position, will wedge tightly between them.

The outer end of the cylinder 10 has a reduced, elongated, internally threaded, sleeve 17 in which there is threaded a tubular shaft 18. An actuating rod 19 has a swivelling connection, at one end, with the inner end of the shaft 18, and its other end telescopes with, and has a swivelling connection with, the valve rod 12.

An actuating shaft 20 works axially through the sleeve 17 and shaft 19 and has a splined connection with the latter. The outer end of the shaft 20 works through a stuffing box 21 at the outer end of the sleeve 17 and has a hand wheel 22 fixed thereon.

Pressure fluid lines 23, 23 are connected into the cylinder, on opposite sides of the piston 11 and these lines may be controlled by conventional control valves, (not shown).

With the valve operating mechanism set, or adjusted, as shown in the drawing steam, or other pressure fluid, may be admitted through one of said lines, as for example the outer line, as shown, and the valves will be forced, thereby, into closed position, as shown in the figure and pressure fluid may be admitted through the other line to force the valves into the reverse, or open, position. When said fluid is admitted through one line, the valve of the other line should be partly closed so as to retard the escape of the pressure fluid to form a cushion in the cylinder against which the piston will work to prevent breakage of parts.

When the valves are moved into closed position the rod 20 may be turned through the hand wheel 22 to screw the shaft 18 inwardly and the actuating rod 19 will be forced inwardly, thereby, until its inner end seats against the internal seat 24 of the valve rod 12 and the valves will be thus maintained in closed position and the pressure fluid may be relieved from the cylinder.

When the valve mechanism is set, or adjusted for the manipulation of the valves by fluid pressure the shaft 18 is adjusted inwardly to an intermediate position, as shown in the figure thus giving the piston 11 the required range of movement on the rod 19 to open or close the valves, but said valves may be manually actuated, independent of the pressure fluid. By adjusting the shaft 18 to its extreme outward position, the valves will be fully opened, and by adjusting said shaft 18 to its extreme inward position the valves will be closed and locked, or secured in closed position.

In use the valve mechanism is permanently installed on the casing of a well and in the event gas pressure be encountered of sufficient intensity to likely cause a blow out, or to injure the well the valve may be closed and the pressure restrained. If the escaping gas is so violent as to be dangerous the valve can be operated, at a distance, by steam or other fluid pressure through the lines 23. If, however, the gas pressure is only threatened, or is not so violent as to be dangerous the valve may be closed by hand.

After the valve is closed it may be desirable to pump mud laden fluid into the well to mud up the walls of the bore to seal off the escaping gas and this may be done with said valves 14, 14 closed by pumping said mud laden fluid down around said closed valves through the bypass 5.

What we claim is:

1. A safety valve mechanism comprising a valve casing having a fluid passageway therethrough and spaced valve seats aligned with said passageway, a cylinder attached to said casing, a piston in the cylinder, a valve rod attached to the piston, oppositely disposed valves connected to said rod and movable into and out of registration with said seats, a tubular shaft having a threaded connection with the outer end of the cylinder, an actuating rod having a swivelling connection at one end with said shaft, the other end of said rod telescoping with and having a swivelling connection with the valve rod and an actuating shaft extending axially through and having a splined connection with said tubular shaft and means for supplying fluid pressure into the cylinder on either side of said piston to actuate said valves.

2. A safety valve mechanism comprising a valve casing having a fluid passageway therethrough and a valve seat aligned with said passageway, a cylinder associated with the casing, a piston in the cylinder, a valve arranged to cooperate with said seat to open and close said passageway, means connecting the valve to the piston, a shaft having a threaded connection with the cylinder, an actuating rod having a swivelling connection, at one end, with said shaft, and whose other end has a swivelling and slip joint connection with respect to said piston, an actuating rod associated with said shaft and longitudinally movable relative thereto, means preventing the rotation of the actuating rod relative to said shaft and means for supplying pressure fluid into the cylinder on either side of the piston to actuate the valve.

3. A safety valve mechanism comprising a valve casing having a fluid passageway therethrough and a valve seat aligned with said passageway, a cylinder associated with the casing, a movable valve actuator in the cylinder, a valve arranged to cooperate with said seat to open and close the passageway, means connecting the valve to the actuator, a shaft having a threaded connection with the cylinder and operatively connected to the actuator, an actuating rod associated with said shaft and longitudinally movable relative thereto, means preventing the rotation of the actuating rod relative to said shaft and means for applying pressure fluid to said actuator.

4. A valve mechanism comprising a valve casing having a valve seat, a valve movable into active position against said seat to close the seat and also movable into inactive position to open said seat, means having a swiveling connection with the valve and adapted to be operated by fluid under pressure to move the valve into either of said positions, a shaft having a threaded connection with said casing, an actuating rod associated with said shaft and longitudinally movable relative thereto, means preventing the rotation of the actuating rod relative to said shaft and means connected to said shaft and having a swiveling slip joint connection with said fluid pressure operable means.

In testimony whereof we have signed our names to this specification.

ARTHUR J. PENICK.
KIRBY T. PENICK.